March 28, 1939.  T. WESTENKIRCHNER  2,151,818

KITCHEN SINK

Filed Nov. 30, 1937

INVENTOR.
Theresa Westenkirchner
BY
Marvin R. Cluvin
ATTORNEY

Patented Mar. 28, 1939

2,151,818

UNITED STATES PATENT OFFICE 2,151,818

KITCHEN SINK

Therasa Westenkirchner, Toledo, Ohio

Application November 30, 1937, Serial No. 177,173

1 Claim. (Cl. 4—187)

This invention relates to appliances used in kitchens for washing and draining miscellaneous tableware, as dishes, cutlery and like articles used in cooking and serving food.

An object of the invention is to provide a sink in which the articles may be easily washed, and having end extensions for rinsing, draining and drying, combined in a convenient manner.

A further feature is in the provision of hinged splash boards on the extensions to avoid wetting the user and adjacent premises.

Another purpose is to produce a rack for the dishes whereby they are held upright on edge, thereby effectually draining and drying them.

A still further object is to provide a set of pans for one of the end extension compartments in which fruit and vegetables may be placed and subjected to water, renewing their fresh appearance if wilted.

These several aims and objects are attained by the novel design, construction and arrangement of parts hereinafter described and shown in the annexed drawing, a consequential part of this disclosure, and in which.

Figure 1:
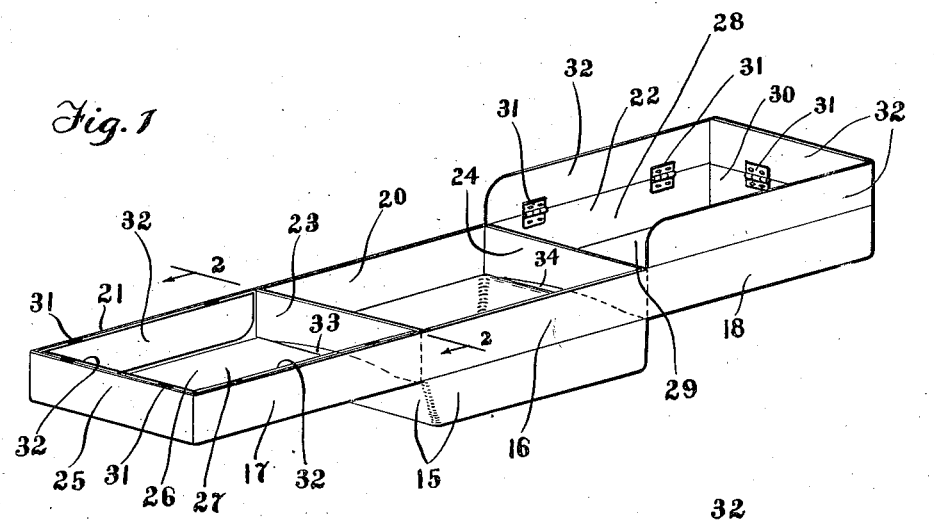
Figure 1 is a perspective view of the embodiment of the invention.

Describing in greater detail, with reference to the drawing, the appliance consists of a generally rectangular sink 15, so located as to be supplied with water, both hot and cold preferred. An outlet, not shown, connects with a waste pipe as usual.

Above the front wall of the sink, and connected in a leak proof manner is a raised wall 16, having integral end extensions 17 and 18, and at the rear is a similar raised wall 20 having end extensions 21 and 22.

Over the side walls of the sink are raised transverse partitions 23 and 24, these walls and partitions constituting a frame by which the effective depth of the sink is materially increased.

The walls 17 and 21 are connected at their ends by a transverse, upright plate 25 and provided with a bottom 26, forming a floored compartment 27.

A similar compartment 28 at the other end of the sink is formed by a bottom plate 29 and end plate 30.

Figure 2:
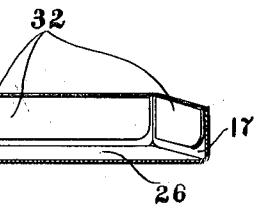
Figure 2 is a transverse sectional view taken on line 2—2 of Figure 1.

Attached to the upper edges of the plates 17, 21 and 25, and also to the plates 18, 22 and 30, by hinges 31, are splash plates 32 which can be raised and lowered as occasion requires, thereby forming end compartments of considerable depth, as indicated in the righthand portion of Figure 2.

In order to allow the water to pass from the compartments 27—28, the floors of which are inclined downwardly towards the sink, the partitions 23 and 24 are recessed at their lower edges as at 33—34, providing for drainage.

Figure 3:
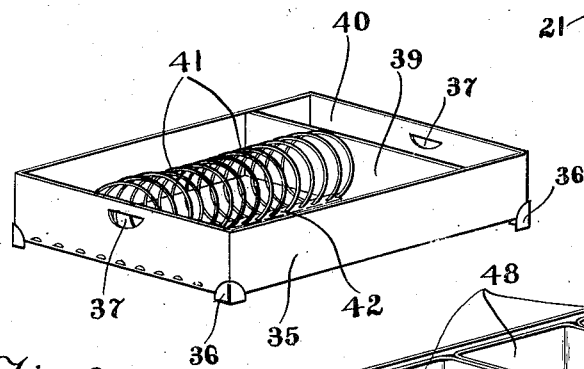
Figure 3 is a perspective view of the dish draining rack as an entity.
Figure 4:
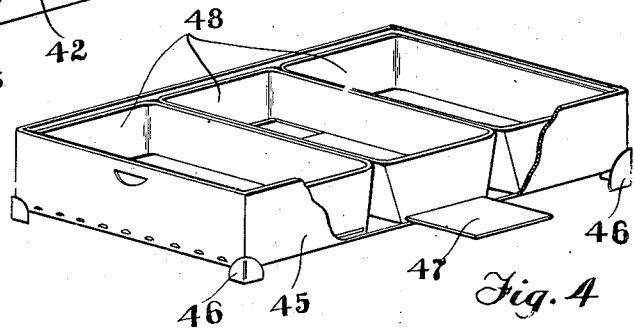
Figure 4 is a similar view of the vegetable freshening pans and holder, which, like the draining devices, are disposable in one of the end extensions of the sink.

A dish draining device, shown in Figure 3, consists of a box-like container 35, having short feet 36 and its ends provided with hand grips 37 for convenience in handling.

The flooring of the container is preferably made of slats and a partition 39 affords a receptacle 40 for draining knives, forks, spoons, etc.

Disposed between the partition and outward wall is a coarse wire helix 41, its coils being engaged in a keeper rail 42 in the bottom of the container, the coils adapted to maintain plates, saucers, etc., on their edge in an upright position.

This container is normally disposed in one or the other of the compartments 27—28, as is also a tray 45, having legs 46 and adapted to receive a plurality of pans 48 having slidable bottom 47 to contain vegetables and the like to be subjected to moisture for refreshing.

From the foregoing it will be seen that a convenient and practical device for kitchen requirements has been described in its preferred embodiment, but it will be understood that changes may be made as may come within the spirit and scope of the appended claim.

Having thus described the invention and set forth the manner of its construction and application, what is claimed as new and sought to secure by Letters Patent, is:

A kitchen sink having end compartments, and foldable walls hingedly engaged on the upper edges of the outer walls of said compartments to stand vertically when erect and fold inwardly closely adjacent said inner walls when folded thereagainst.

THERASA WESTENKIRCHNER.